UNITED STATES PATENT OFFICE.

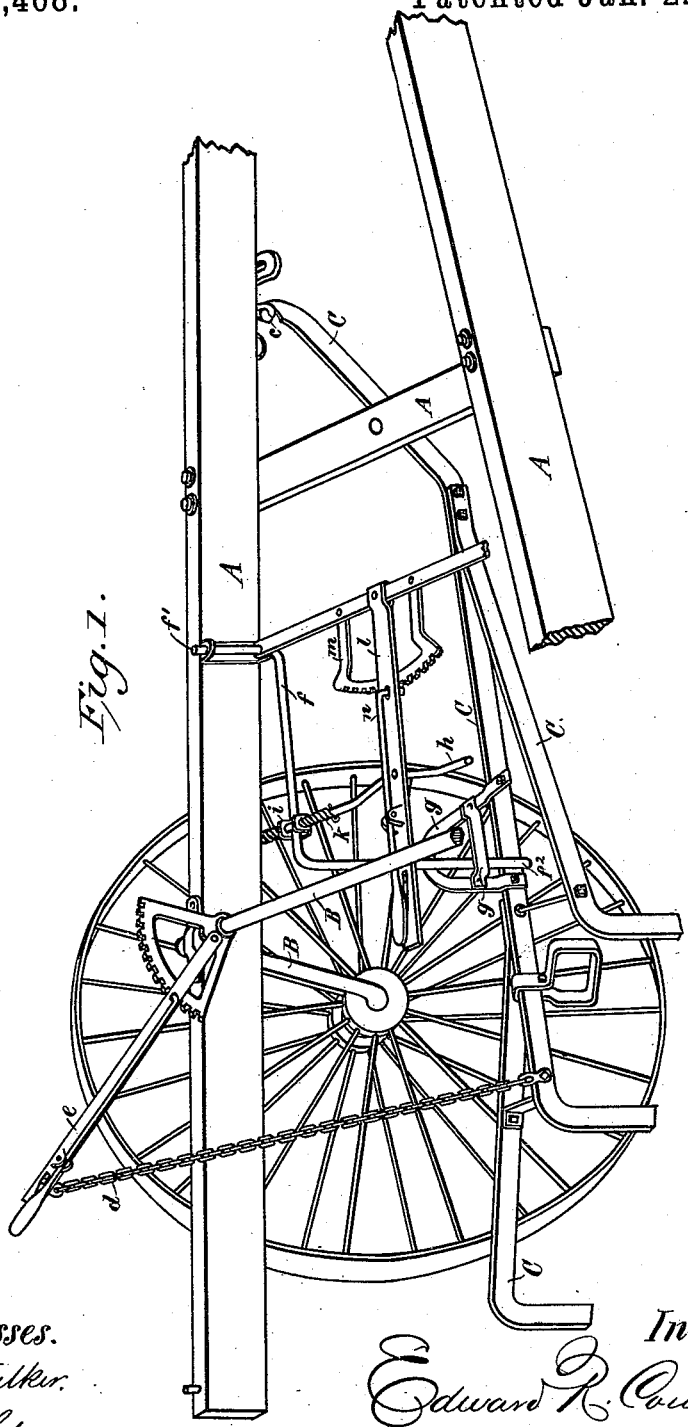

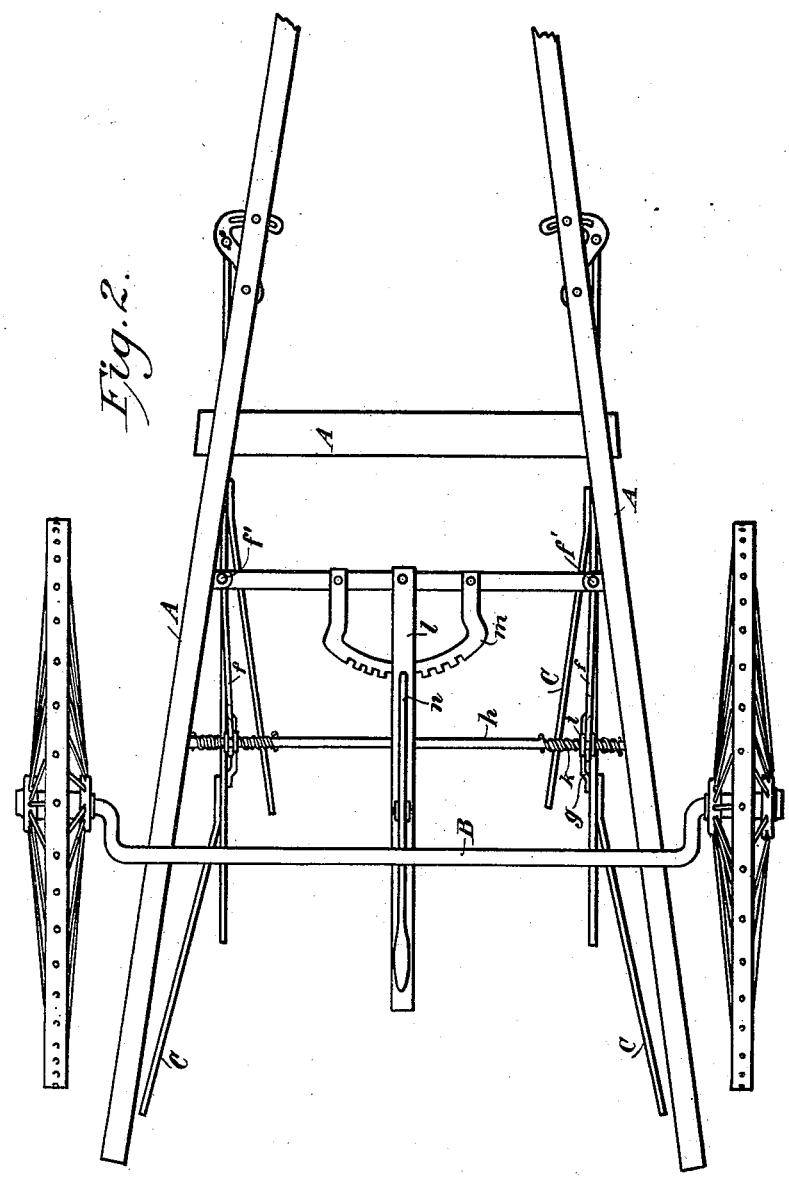

EDWARD R. CONKLIN, OF WAUSEON, OHIO.

WHEEL-CULTIVATOR.

SPECIFICATION forming part of Letters Patent No. 396,468, dated January 22, 1889.

Application filed August 3, 1888. Serial No. 281,881. (No model.)

*To all whom it may concern:*

Be it known that I, EDWARD R. CONKLIN, a citizen of the United States, residing at Wauseon, Fulton county, Ohio, have invented certain new and useful Improvements in Wheel-Cultivators, of which the following is a specification.

My invention relates to and its object is to provide, first, a means for preserving the horizontal position of the plow beams or frames to which the shovels are attached, and, second, a hillside attachment or means for preventing the suspended plows or shovels from sliding downhill when one side of the cultivator is raised higher than the other.

In the accompanying drawings, made part hereof, Figure 1 is a perspective side view of my cultivator with a portion removed, and Fig. 2 is a plan view of a cultivator provided with my devices.

Like letters of reference represent like parts in both views.

A A is the frame of the machine supported upon axle B. Each of the two plow-beams C at its forward end is supported by and suspended from frame A by means of hook and eye $c$, and at its rear end by a chain, $d$, leading up to lever $e$, by means of which lever and chain the plow beam or frame is raised and lowered. The driver rides with his feet resting in stirrups on the plow-beams, and thus causes either of the two sets of shovels to swing either to the right or left, so as to avoid obstructions and to follow any irregularities in the corn-rows. Ordinarily the teeth or shovels are in a horizontal plane; but if the shovel-beams be thrown outwardly the shovels at the inner side of the beams will dip deeper into the ground, while the shovels at the outer side of the beams will tilt upwardly, leaving the ground entirely. If the shovel-beams be swung inwardly, the reverse result takes place, the outer shovels dipping deeper and the inner shovels being thrown out of the ground. To obviate this objection and to furnish a guide for the suspended plow-beams and a means of aiding the foot of the driver in restoring the plow-beam to its proper position after it has been swung either to the right or left, I provide swiveled rod or brace $f$, bent somewhat in the shape of and moving like a horizontal crank, the upper end, $f'$, which is confined in a suitable socket on frame A, being the center of its rotation, while the opposite and lower end, $f^2$, rotates horizontally in the segment of a circle.

Attached to plow-beam C is guide $g$ $g$, which embraces and slides vertically upon the lower end, $f^2$, of crank $f$. The arrangement of guide $g$ and crank $f$, as shown, permits the plow-beams to be moved laterally and vertically, but prevents the plow-beams from tilting out of a horizontal plane, or, rather, the plane of the frame of the machine. If the lower end of rod $f$ were forked and caused to embrace the plow-beam C, it would be obviously the mechanical equivalent of the device here shown.

Immediately beneath the frame of the machine and extending across it is a rod, $h$, provided with loops $i$, sliding loosely thereon, but engaged by the spiral springs $k$, embracing and attached to rod $h$. The horizontal portion of each of the rods $f$ passes through one of the loops $i$ on cross-rod $h$, which at its center is attached to lever $l$. This lever moves horizontally over a segmental rack, $m$, and is provided with a stop, $n$, which may be made to engage the rack $m$ at any point, so that the lever $l$ may be rigidly set at any desired angle. The plow, by means of lever and chain $d$ $e$, being lowered to a proper depth, and lever $l$ being set centrally on its rack, and the driver being seated with his feet upon the plow-beams, he may, as the machine proceeds forward, with his feet throw either or both of the plow-beams either to the right or left, the swiveled brace-rod $f$ and guide $g$ preventing the plow beam or frame from tipping out of a horizontal position, while the loop and spring $i$ $k$ yield to the lateral motion of the plow-beams and swiveled brace-rods, but tend to restore them to their proper position when the thrust of the driver's foot is removed.

When the machine is proceeding along a hillside and the plows by their weight tend to slide downhill, lever $l$ may be thrown either to the right or left, carrying with it rod $h$, swiveled brace-rods $f$, guides $g$, and plow-beams C to such a distance that the pressure of springs $k$ on rod $h$ will compensate for and overcome the lateral thrust of the plows, thus preventing the plows from sliding downhill. The lever $l$ may be locked in any desired position, or may be held temporarily in the driver's hand.

The hillside attachment, consisting of rod $h$ and its loops and springs and lever $l$ and its rack and stop, may be dispensed with entirely in level fields.

What I claim as my invention, and desire to secure by Letters Patent, is—

1. In a cultivator, a swiveled crank brace-rod rotating horizontally, in combination with the plow-beam or drag-bar provided with a guide sliding upon said brace-rod, substantially as shown and described, for the purpose specified.

2. In a cultivator, a swiveled crank brace-rod rotating horizontally, in combination with the plow-beam or drag-bar provided with a guide sliding upon said brace-rod, and spring $k$, substantially as shown and described, for the purpose specified.

3. In a cultivator, the frame of the machine, the plow-beams, swiveled brace-rods $f$, and guides $g$, in combination with cross-rod $h$ and lever $n$, substantially as shown and described, for the purposes specified.

4. In a cultivator, the frame of the machine, the plow-beams, swiveled brace-rods $f$, and guide $g$, in combination with cross-rod $h$, lever $l$, rack $m$ and stop $n$, and springs $k$, substantially as shown and described, for the purposes specified.

EDWARD R. CONKLIN.

In presence of—
M. SLUSSER,
M. BRITTON.